United States Patent
Ariyoshi et al.

(10) Patent No.: US 6,174,977 B1
(45) Date of Patent: Jan. 16, 2001

(54) COLD CURABLE RESIN COMPOSITION AND BASE MATERIAL COATED WITH THE SAME

(75) Inventors: Yasushi Ariyoshi; Takehiro Suzuki, both of Tokyo (JP)

(73) Assignee: Toyo Ink Mfg. Co., Ltd., Tokyo (JP)

( * ) Notice: Under 35 U.S.C. 154(b), the term of this patent shall be extended for 0 days.

(21) Appl. No.: 09/425,296

(22) Filed: Oct. 25, 1999

(30) Foreign Application Priority Data

Oct. 26, 1998 (JP) .................................................. 10-303444

(51) Int. Cl.$^7$ ...................................................... C08F 30/08
(52) U.S. Cl. .......................... 526/194; 526/279; 526/219; 526/219.2; 526/232.1; 526/229; 525/100; 525/102; 525/103; 525/90; 525/474; 525/477; 525/479; 428/447
(58) Field of Search ..................................... 526/279, 194, 526/219, 219.2, 232.1, 229; 525/90, 102, 103, 100, 477, 479, 474; 428/447

(56) References Cited

U.S. PATENT DOCUMENTS

| | | | |
|---|---|---|---|
| 5,013,800 | 5/1991 | Inoue | 525/477 |
| 5,760,136 | * 10/1999 | Kato et al. | 525/100 |
| 5,840,291 | * 11/1998 | Tsubakihara et al. | 424/70.12 |
| 5,962,588 | * 10/1999 | Iwamura et al. | 525/103 |
| 5,965,672 | * 10/1999 | Agari et al. | 525/446 |

FOREIGN PATENT DOCUMENTS 0 188 895   7/1986   (EP) .
0 452 098   10/1991   (EP) .

OTHER PUBLICATIONS

JP 07179795 A (abstract), Jul. 1995.*
JP 07003207 A (abstract), Jul. 1995.*
Patent Abstracts of Japan, vol. 018, No. 604 (C–1275), Nov. 17, 1994, JP 06 228467, Aug. 16, 1994.

* cited by examiner

Primary Examiner—Margaret G. Moore
(74) Attorney, Agent, or Firm—Oblon, Spivak, McClelland, Maier & Neustadt, P.C.

(57) ABSTRACT

Disclosed is a cold curable resin composition comprising at least a block copolymer in which a polymer portion having an epoxy group, a hydroxyl group and a hydrolytic silyl group and a polyorganosiloxane portion exist in the same molecular chain. A base material coated with the curable resin composition is also disclosed herein. The resin composition of the present invention has high performance in application to, for instance, an inorganic base material such as a plastic plate, e.g., an acrylic plate and glass, and has excellent cold curing properties, possesses high de-staining ability and excellent adhesive properties, and further can form a smooth and transparent coating film.

19 Claims, No Drawings

COLD CURABLE RESIN COMPOSITION AND BASE MATERIAL COATED WITH THE SAME

BACKGROUND OF THE INVENTION

1. Field of the Invention

The present invention relates to a cold curable resin composition used in a process for imparting water repellency and oil repellency to a material to be coated and also relates to a base material coated with the resin composition.

2. Description of the Prior Art

In recent years, methods of reducing free energy of the surfaces of various base materials have been developed to impart various types of functionality. The fields concerned are diversified and there is a demand for base materials provided with the surface having de-staining, de-labeling, de-scribbling and de-snowing abilities and water-, oil- and ink-repellency. De-scribbling ability imparted to various materials' surfaces such as building walls, telephone boxes, or subway trains is called *Anti-Graffiti*. A coating to such base materials+ surfaces to impart the *Anti-Graffiti Effect* to them may also be called *Anti-Graffiti Coating*.

A polyorganosiloxane type paint is used as one of means for providing these functions. However, because resistance to an organic solvent is demanded of, particularly, such a surface-treating agent used with the intention of imparting de-scribbling ability, strict conditions are required and hence it cannot produce a long lasting, sufficient de-scribbling effect. The polyorganosiloxane type paint also produces phase separation on account of low compatibility, i.e., low miscibility between various resins and polyorganosiloxane. As a consequence, the polyorganosiloxane type paint poses the problems that it gives poor transparency to the coating and produces tacky feeling.

As the measures for solving this compatibility problem, the use of a graft or block copolymer of polyorganosiloxane and other components is known. For example, Japanese Patent Publication No.3-46026 discloses a curable composition comprising polyorganosiloxane having alkenyl group bound to silicon and organopolysiloxane having hydrogen directly bound to silicon, being curable in the presence of a catalyst by hydrosilylation reaction between the silicon-bound alkenyl group and the silicon-bound hydrogen. Japanese Patent Application Laid-Open No.2-298511 discloses a silicon type peeling agent comprising a block copolymer consisting of a polymer block having a glass transition point of 50° C. or more and a polyorganosiloxane block, a monomer containing an epoxy type functional group and an onium salt type curing catalyst. Japanese Patent Application Laid-Open No.6-228467 discloses a resin composition for de-staining paint, which comprises a block copolymer of an epoxy group-containing silicon resin and a carboxyl group-containing polyester resin, and is used as a moister-curing varnish obtained by allowing the unreacted epoxy group of the block copolymer to react with aminoalcoxysilane.

However, no resin composition having such advantageous properties as (a) rapid curability at normal or ambient temperature to develop a de-scribbling effect within a day and (b) long durability in use, which is the time also referred to as pot life in this field, has been found so far.

SUMMARY OF THE INVENTION

It is an object of the present invention to provide a curable resin composition which is cured rapidly at normal temperature to develop a de-scribbling effect within a day and has long durability in use and a base material coated with the resin composition.

To accomplish this and other objects, the cold curable resin composition of the present invention comprises a block copolymer of (a) a polyorganosiloxane portion and (b) a polymer portion having an epoxy group, a hydroxyl group and a hydrolytic silyl group. It is more preferable that the composition further comprises a polyfunctional amine compound. In this case, the ratio of the number of active hydrogen of amino groups contained in said polyfunctional amine compound to the number of said epoxy groups is preferably in a range between 0.8 and 1.25. Further in this case, said polyfunctional amine compound is preferably polyoxyalkylenepolyamine having a molecular weight of 1,000 or less.

The block copolymer is preferably a polymer in which (a) a polydimethyl siloxane portion and (b) a copolymer portion comprising an α, β-ethylenic unsaturated monomer having an epoxy group, an α, β-ethylenic unsaturated monomer having a hydroxyl group, an α, β-ethylenic unsaturated monomer having a hydrolytic silyl group and other α, β-ethylenic unsaturated monomer are bound with each other in the form of a block polymer. In this case, said composition preferably contains 10–50 parts by weight of said α, β-ethylenic unsaturated monomer having an epoxy group, 1–10 parts by weight of said α, β-ethylenic unsaturated monomer having a hydrolytic silyl group, 1–20 parts by weight of said α, β-ethylenic unsaturated monomer having a hydroxyl group and 0.05–20 parts by weight of said polyorganosiloxane portion.

In the cold curable resin composition of the present invention, said block copolymer is preferably produced by copolymerizing an α, β-ethylenic unsaturated monomer having an epoxy group, an α, β-ethylenic unsaturated monomer having a hydroxyl group, an α, β-ethylenic unsaturated monomer having a hydrolytic silyl group and other one or more α, β-ethylenic unsaturated monomers in the presence of a polymer azo-type initiator represented by the following general formula and a radical polymerization initiator having a molecular weight of 1,000 or less:

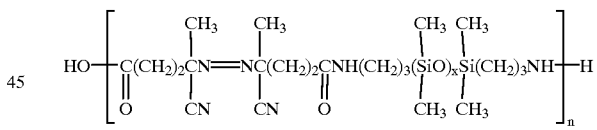

wherein x represents an integer from 10 to 300 and n represents an integer from 1 to 20. In this case, said radical polymerization initiator having a molecular weight of 1,000 or less is preferably a compound selected from the group consisting of peroxides and azobis compounds.

In the cold curable resin composition of the present invention, it is further preferable that the composition further comprises a polyfunctional (metha)acrylate compound. More preferably, the polyfunctional (metha)acrylate compound has a molecular weight of 1,000 or less. It is also preferable that the polyfunctional (metha)acrylate compound is ditrimethylolpropane tetra(metha)acrylate. When the composition comprises a polyfunctional (metha)acrylate compound as above mentioned, the ratio of the number of active hydrogen of amino groups contained in said polyfunctional amine compound to the sum of the number of said epoxy groups and the number of acrylate groups of said polyfunctional (metha)acrylate compound is preferably in a range between 0.8 and 1.25.

In the cold curable resin composition of the present invention, it is also preferable that the composition further comprises a silane compound having an epoxy group or an amino group.

From another aspect of the present invention, a coated base material is further disclosed herein, whose surface is coated with the cold curable resin composition above described. Said base material to be coated may be the one selected from the group consisting of artificial stones, glass, plastic plates and plastic films. The coated base material is preferably used for de-staining exterior or interior of civil or construction materials. It may be more beneficial in these usage.

Furthermore, the present invention is especially effective if the base material to be coated is a transparent one. From this point of view, a coated transparent base material is further disclosed herein, whose one surface or both surfaces are coated with the cold curable resin composition above described, wherein said coated transparent base material transmits 99% of light with a wavelength of 660 nm. The coated, transparent base material is again preferably used for de-staining exterior or interior of civil or construction materials.

From another aspect of the present invention, a method for producing a cold curable resin composition is disclosed herein, said method comprises copolymerizing an α, β-ethylenic unsaturated monomer having an epoxy group, an α, β-ethylenic unsaturated monomer having a hydroxyl group, an α, β-ethylenic unsaturated monomer having a hydrolytic silyl group and other one or more α, β-ethylenic unsaturated monomers in the presence of a polymer azo-type initiator represented by the following general formula and a radical polymerization initiator having a molecular weight of 1,000 or less:

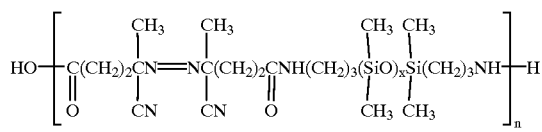

wherein x represents an integer from 10 to 300 and n represents an integer from 1 to 20.

In all of those descriptions of the present invention aforementioned, the hydrolytic silyl group is preferably an alkoxysilyl group.

It is noted that because the present invention resides in a cold curable resin composition for coating, the block copolymer and the polyfunctional (metha)acrylate compound may be stored together as a major agent, and the polyfunctional amine compound is stored as a curing agent, separately from the major agent. The major agent and the curing agent are mixed with each other just before coating to carry out a coating operation.

The reason why the contamination-resistant properties such as de-staining are developed on the surface coated with the cured film of the composition is that the polyorganosiloxane portion in the copolymer comprising said polyorganosiloxane portion and other polymer portion is arranged on the surface of the coating due to its low free energy. And furthermore, since this copolymer is a block copolymer, the polyorganosiloxane portions and the other copolymers which are incompatible with each other are phase-separated microscopically within the coating film and hence scattering of visible light is reduced within the film. As a consequence, transparency is imparted to the coating in reality. In addition, crosslinking reaction proceeds rapidly by means of cleavage reaction of the three-member ring of the epoxy group caused by active hydrogen group and self-condensation reaction of the hydrolytic silyl group caused by moisture in the air to complete a coating operation with ease. As a result, a coating combining the resistance to stain, transparency and toughness can be formed rapidly.

Moreover, the de-staining effect when scribbling is made using, for instance, a magic marker or lacquer can be improved by allowing a hydroxyl group, which is hydrophilic, to exist in the copolymer.

It is herein further disclosed that using a polyfunctional amine compound as a curing agent, the cold curable resin composition comprises (a) a major agent comprising the above block copolymer and (b) the curing agent. When, in addition to a curing means like the self-condensation of the hydrolytic silyl group by moisture, a polyfunctional amine compound is further introduced just before coating, the curing time within a day, duration time or so-called pot life within a practical range, and high toughness of the coating are attained more exactly owing to the extremely rapid curing, equivalent reaction between the epoxy group in the major agent and the polyfunctional amine compound. Such an introduction of polyfunctional amine ensures that a coating operation is carried out with very ease and at the same time, owing to many bridges formed in the coating film after being cured, molecular intrusion into the coating film from outside can be effectively prevented even when the coated product is used for a long period of time. This restrains the deterioration of the coating film with time and the occurrence of phenomena such as breaking and peeling of the coating film even when attachments by, for instance, scribbling are wiped (particularly, in the case of performing a wiping operation using an organic solvent).

In the resin composition of the present invention, the inventors have also remarked a Michael addition reaction which is generally induced between a polyfunctional amine compound and a polyfunctional (metha)acrylate. In the case of utilizing a polyfunctional amine as a curing agent as aforementioned, if a polyfunctional (metha)acrylate compound is further blended in advance in the major agent, for example, a Michael addition reaction induced between these compounds functions as an effective crosslinking and curing means. Specifically, in addition to the formation of crosslinks between the block copolymer chains by the aid of the polyfunctional amine compound, the polyfunctional amine compounds added to the primary chain of the block copolymer are further bound by the aid of the polyfunctional (metha)acrylate with the result that a multiple and multi-staged crosslinking network is automatically realized inside the coating film.

The multiplied and multi-staged crosslinking network as aforementioned promotes the effect of preventing foreign molecules from intruding from outside more significantly. Furthermore, if the polyfunctional (metha)acrylate compound is blended in the major agent formulated with the block copolymer and the resulting composition is stored, the storage stability of the major agent can be enhanced. In this point, also, the use of the polyfunctional (metha)acrylate compound is beneficial.

Further the inventors understand that addition of a silane compound having an epoxy or amino group to the cold curable resin composition to improve the adhesive strength between an inorganic material to be coated and the coating film is among the means for further improving the quality of the coating.

The curable resin composition of the present invention is cured at normal temperature (or ambient temperature such as room temperature) within 24 hours, has high de-staining ability, and forms a smooth coating film on, for instance, inorganic base materials such as glass or plastic plates such as acrylic plates. It is therefore useful as a de-staining paint in construction and civil fields. Base materials, particularly, transparent base materials coated with the curable resin composition develop the aforementioned qualities without being damaged in its transparency and are hence useful as the parts of construction and civil structures and products requiring a de-staining ability. According to the present invention, coating film having a light transmittance of 99% or more for the wavelength of 660 nm is typically obtained when the film thickness is within the range of 0.1–30 μm.

DESCRIPTION OF THE PREFERRED EMBODIMENT

A silicone-type block copolymer containing at least a block copolymer, wherein (a) a polyorganosiloxane portion and (b) a polymer portion having an epoxy group, hydroxyl group and hydrolytic silyl group co-exist in the same molecular chain, is essential in the present invention to develop water and oil repellent characteristics while the transparency is maintained. Here, the "silicone-type block copolymer" represents a straight chain polymer in which a terminal of polyorganosiloxane and a terminal of a polymer which can be produced by the polymerization of monomers other than organosiloxane are bound with each other by a covalent bond. Two or more types of monomer other than organosiloxane may be used. The silicone-type block copolymer may be di-, tri- or more-iterative block copolymer. The bound portion between a polyorganosiloxane portion such as polydimethylsiloxane portion and other copolymer portion may have any structure if it is stable for a long period of time in a solution and in the coating film.

Several ideas about the method for producing the above silicone-type block copolymer are considered. From an industrial point of view, an example of the method is given in which a polydimethylsiloxane compound having some group provided with a chain transfer function at its terminal is allowed to exist in a polymerizing system of α, β-ethylenic unsaturated monomers. Another method in which a polyorganosiloxane compound having a group which functions as a polymerization initiator such as an azo group or a peroxy group is used to polymerize α, β-ethylenic unsaturated monomers is simple and hence desirable.

One Example of polyorganosiloxane having a chain transfer function is the one which includes a SH group and is represented by the general formula:

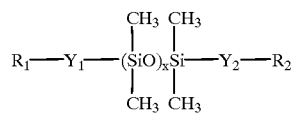

wherein x denotes an integer from 10 to 300, Y1 and Y2 are respectively a straight chain having a molecular weight of 200 or less and at least one of R1 and R2 is an SH group and the remainder is an alkyl group. Using this polymer chain transfer agent, α, β-ethylenic unsaturated monomers are copolymerized to produce the silicone-type block copolymer.

Specific examples of the polydimethylsiloxane compound having a group which functions as a polymerization initiator include polymer azo-type initiators, which is represented by the general formula:

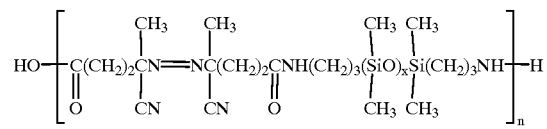

wherein x denotes an integer from 10 to 300 and n denotes an integer from 1 to 20. The silicone-type block copolymer can be produced using the polymer azo-type initiator in one stage by copolymerizing an α, β-ethylenic unsaturated monomer having an epoxy group and other one or more α, β-ethylenic unsaturated monomers.

Given as examples of the epoxy group-containing α, β-ethylenic unsaturated monomer used in the present invention are glycidyl (metha)acrylate, glycidyl aryl ether, 2,3-epoxy-2-methylpropyl (metha)acrylate, (3,4epoxycyclohexyl)methyl(metha)acrylate, 4-vinyl-1-cyclohexene-1,2-epoxide.

Examples of the hydrolytic silyl group-containing α, β-ethylenic unsaturated monomer used in the present invention include (metha)acryloxyalkylalkoxysilanes such as γ-(metha)acryloxypropyltrimethoxysilane, γ-(metha)acryloxypropyltriethoxysilane and γ-(metha)acryloxypropyltriisopropoxysilane; (metha)acryloxyalkylalkoxyalkylsilanes such as γ-(metha)acryloxypropylmethyldimethoxysilane and γ-(metha)acryloxypropylmethyldiethoxysilane; vinyltrimethoxysilane, vinyltriethoxysilane, vinyltriisopropoxysilane, aryltriethoxysilane, vinylmethyldimethoxysilane, vinylmethyldiethoxysilane and vinyltris(2methoxyethoxy)silane.

Examples of the hydroxyl group-containing α, β-ethylenic unsaturated monomer used in the present invention include 2-hydroxyethyl(metha)acrylate, 1hydroxypropyl(metha)acrylate, 2-hydroxypropyl(metha)acrylate, 4hydroxybutyl(metha)acrylate, diethylene glycol mono(metha)acrylate, polyethylene glycol mono(metha)acrylate, polypropylene glycol mono(metha)acrylate, polytetramethylene glycol mono(metha)acrylate and hydroxystyrene.

Examples of other copolymerizable α, β-ethylenic unsaturated monomer include, though not limited to, alkylesters of unsaturated monocarboxylic acid such as methyl(metha)acrylate, ethyl(metha)acrylate, n-propyl(metha)acrylate, isopropyl(metha)acrylate, n-butyl(metha)acrylate, iso-butyl (metha)acrylate, t-butyl(metha)acrylate, 2-ethylhexyl (metha)acrylate, cyclohexyl(metha)acrylate, stearyl(metha)acrylate and lauryl(metha)acrylate; nitrites such as (metha)acrylonitrile; styrenes such as styrene and α-methylstyrene; unsaturated carboxylic acids such as (metha)acrylic acid, maleic acid, fumaric acid and itaconic acid; amide group-containing monomers such as (metha)acrylamide, N,N-dimethylacrylamide, N-iso-propylacrylamide and diacetonacrylamide; methylol group-containing monomers such as N-methylol(metha)acrylamide and dimethylol(metha)acrylamide; alkoxymethyl group-containing monomers such as N-methoxymethyl(metha)acrylamide and N-butoxymethyl(metha)acrylamide; amino group-containing monomers such as N,N-dimethylaminoethyl (metha)acrylate and N,N-diethylaminoethyl(metha)acrylate; olefins such as ethylene, propylene and isoprene; dienes such as chloroprene and butadiene; vinyl ethers such as methyl vinyl ether, ethyl vinyl ether, n-propyl vinyl ether, iso-propyl vinyl ether, n-butyl vinyl ether and iso-butyl vinyl ether; and vinyls of fatty acid such as vinyl acetate and vinyl propionate. The above other α, β-ethylenic unsaturated monomers may be used either singly or in combinations of two or more. Among these compounds, alkylesters of unsaturated monocarboxylic acid and styrenes are preferably used.

Here, (metha)acryloxy represents methacryloxy or acryloxy, (metha)acrylate represents methacrylate or acrylate, (metha)acrylonitrile represents methacrylonitrile or acrylonitrile, (metha)acrylic acid represents methacrylic acid or acrylic acid and (metha)acrylamide represents methacrylamide or acrylamide.

In the case where particularly high weatherability is required, for instance, to prevent the deterioration of a coating caused by ultraviolet absorption, α,β-ethylenic unsaturated monomers containing a functional group possessing a ultraviolet absorbing function and/or light stabilizing function may be copolymerized. Examples of adequate ultraviolet absorbing agents and light-stabilizing agents include the following compounds:

Ultraviolet Absorbing Agent

RUVA-93(Otsuka Chemical Co., Ltd.)

2-(2'-Hydroxy-5'-methacryloxyethylphenyl)-2H-bezotriazole

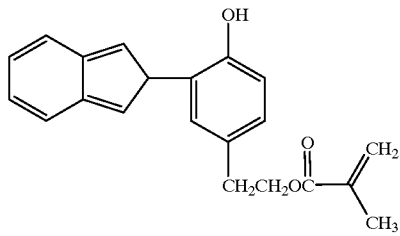

Light Stabilizing Agent

ADK Stab LA-82(Asahi Denka Kogyo K.K.)

1,2,2,6,6-Pentamethyl-4-piperidylmethacrylate

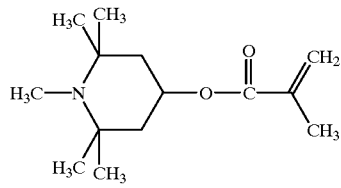

In general, when polymerization is performed using only the polymer azo-type initiator, the amount of an azo group in the system is relatively small. Hence reduction in polymerization conversion rate, increase in molecular weight, and increase in viscosity are caused in the produced paint, possibly giving rise to problems concerning the workability of the paint. It is therefore necessary to reduce the molecular weight by combining a radical polymerization initiator and/or a chain transfer agent having a molecular weight of 1,000 or less. Particularly the use of polymerization initiator is preferred in the points of polymerization conversion rate and odor. Examples of the radical polymerization initiator having a molecular weight of 1,000 or less include, though not limited to, peroxides such as dibutyl peroxide, benzoyl peroxide and lauroyl peroxide and azobis compounds such as 2,2'-azobisisobutylonitrile and 2,2'-azobis-2,4dimethylvaleronitrile.

The material produced by the polymerization initialized by the radical polymerization initiator having a molecular weight of 1,000 or less is a polymer of only the α, β-ethylenic unsaturated monomer provided that there is no bimolecular cessation reaction and chain transfer reaction to polymer. In the above polymerizing method, therefore, a polymer blend may be produced in which a polymer of only the α, β-ethylenic unsaturated monomer is present other than a block polymer produced by polymerization initialized by the polymer azo-type initiator.

The epoxy group-containing resin obtained by the above method comprises at least a silicone-type block copolymer in which a polymer portion having plural epoxy groups and a polyorganosiloxane portion co-exist in the same polymer chain. Because the epoxy-containing resin includes said block copolymer functioning as a compatibly solubilizing agent, the resultant resin is compatible with, for example, polymers of other α, β-ethylenic unsaturated monomers and silicone resins. Therefore, the resin may be used together with these other polymers by mixing these with the resin.

The epoxy group-containing resin, which comprises at least a silicone-type block copolymer as its one component in which (a) a polyorganosiloxane portion and (b) a polymer portion having an epoxy group, hydroxyl group and hydrolytic silyl group co-exist in the polymer chain, preferably contains each monomer component in an amount falling in the following range based on the total amount of the epoxy group-containing resin: (A) epoxy group-containing α, β-ethylenic unsaturated monomer: 10–50 wt. %, more preferably 20–45 wt. %, (B) hydrolytic silyl group-containing α, β-ethylenic unsaturated monomer: 1–10 wt. %, more preferably 2–5 wt. %, (C) hydroxyl group-containing α, β-ethylenic unsaturated monomer: 1–20 wt.%, more preferably 2–15 wt.%, (D) polyorganosiloxane: 0.05–20 wt. %, more preferably 0.1–20 wt. %, and (E) other α, β-ethylenic unsaturated monomer: 0–87.95 wt. %.

When the content of the (A) epoxy group-containing α, β-ethylenic unsaturated monomer is less than 10 wt. %, the crosslinking density is reduced, leading to impaired solvent resistance of the coating film whereas when the content exceeds 50 wt. %, the crosslinking density is increased more than required, leading to impaired impact resistance of the coating film. When the content of (B) the hydrolytic silyl group-containing α, β-ethylenic unsaturated monomer is less than 1 wt. %, no de-scribbling effect is produced at normal temperature within a day whereas when the content exceeds 15 wt. %, crosslinking is excessively densified, leading to impaired impact resistance of the coating film. When the content of the (C) hydroxyl group-containing α, β-ethylenic unsaturated monomer is less than 1 wt. %, the de-staining ability to scribbling is impaired whereas when the content exceeds 20 wt. %, the water resistance of the coating film is impaired. When the amount of (D) polyorganosiloxane is less than 0.05 wt. %, the surface energy can be insufficiently reduced with the result that the de-staining ability of the coating film is reduced. Therefore, the amount less than 0.05 wt. % is undesirable. On the other hand, when the amount of (D) polyorganosiloxane exceeds 20 wt. %, the glass transition point of the coating film is reduced and hence the resulting coating film has the qualities similar to those of rubber. The resulting coating, though it still has a chemical de-staining ability, tends to adsorb dust physically to the surface thereof since the coating film has the characteristics as above. Therefore, the content exceeding 20 wt. % is also undesirable. Also, a large amount of the polyorganosiloxane to be used increases the production cost and is hence not advantageous.

The polymerization is usually carried out by solution polymerization or nonaqueous dispersion polymerization. Examples of a solvent used in the polymerization include alcohols such as methanol, ethanol, isopropanol, butanol and isobutanol; ketones such as acetone, methyl ethyl ketone and methyl isobutyl ketone; esters such as ethyl acetate, propyl acetate, isobutyl acetate and butyl acetate; aromatic hydrocarbons such as toluene and xylene; and aliphatic hydrocarbons such as hexane and heptane. These compounds may be used either singly or in a mixture system.

As the polyfunctional amine compounds as another component of the cold curable resin composition, those which have two or more primary or secondary amino groups and are liquid at normal temperature can be preferably used. It is desirable to use those having a viscosity of 5–1,000 mPa.s (25° C.) and being reduced in odor and toxicity in consideration of mixing with the major agent and workability during coating. It is particularly desirable to use aliphatic amines because the resulting coating film is scarcely yellowed. Specific examples of the aliphatic amines include, though not necessarily limited to, isophorone diamine (IPDA), bis(4-amino-3methylcyclohexyl)methane, 4,4'-bis (p-aminocyclohexyl)methane or polyoxyalkylenepolyamines such as JEFFAMINE D-230, D-400, D-2000 and T-403 manufactured by TEXACOCHEMICAL COMPANY. Among these compounds, it is desirable to use polyoxyalkylenepolyamine compounds having a molecular weight less than 1,000, in particular, in view of yellowing resistance, transparency and solvent resistance.

A polyfunctional (metha)acrylate compound may be blended in the above cold curable resin composition to control the curing rate and the durable time and also the glass transition temperature of the cured product. Preferable polyfunctional (metha)acrylate compounds include compounds produced by esterifying polyhydric alcohol and preferably tri- to hexa-hydric alcohols by using (metha) acrylic acid; or epoxyacrylates produced by adding (metha) acrylic acid to an epoxy resin having two or more epoxy groups. Generally, tri-tetra(metha)acrylates are particularly preferable.

Specific examples of the polyfunctional (metha)acrylate compound to be blended include, though not necessarily limited to, hydroxyl group-containing polyfunctional (metha)acrylate compounds such as pentaerythritol di(metha)acrylate, pentaerythritol tri(metha)acrylate, 3-(metha)acryloyloxyglycerol mono(metha)acrylate, dipentaerythritol tetra(metha)acrylate and dipentaerythritol penta (metha)acrylate; polyfunctional (metha)acrylates such as 1,6-hexanediol di(metha)acrylate, triethylene glycol di(metha)acrylate, polyethylene glycol di(metha)acrylate, tripropylene glycol di(metha)acrylate, neopentyl glycol di(metha)acrylate, ethylene oxide modified bisphenol A di(metha)acrylate, propylene oxide modified bisphenol A di(metha)acrylate, trimethylolpropane tri(metha)acrylate, ethylene oxide modified trimethylolpropane tri(metha) acrylate, propylene oxide modified trimethylolpropane tri (metha)acrylate, pentaerythritol tetra(metha)acrylate, ditrimethylolpropane tetra(metha)acrylate and dipentaerythritol hexa(metha)acrylate; polyvalent metal salts of (metha) acrylic acid or mixtures of these compounds.

In the case of blending the polyfunctional (metha)acrylate compound, the resin composition of the present invention makes use of a Michael addition reaction between a (metha) acryloyl group and an amine having active hydrogen as a first stage crosslinking reaction. In light of miscibility, easiness of mixing, and workability, polyfunctional (metha) acrylate compound having a molecular weight of 1,000 or less is preferably used. If the molecular weight exceeds 1,000, the workability may deteriorate because the viscosity of the compound becomes high and some difficulty may occur as to dissolving it in the other components of the composition. Furthermore, a highly reactive acrylate compound is preferably used. The use of, particularly, ditrimethylolpropane tetra(metha)acrylate among these polyfunctional (metha)acrylate compounds exemplified above is desirable in light of water resistance, weatherability or weather fastness and storage stability.

It is considered that in a system accelerated in curing like the curable resin composition of the present invention, a coating film decreases in adhesion to a substrate or base materials because the bond creation between the components forming the film precedes the action (or bonding) of the components on (with) the substrate. In light of this, in the cold curable resin composition of the present invention, a silane compound having an epoxy group or an amino group may be blended to improve the adhesive strength with an inorganic material to be coated. Incidentally, It is preferable that components having an epoxy group be blended in the major agent and components having an amino group be blended in the curing agent.

Examples of the silane compound having an epoxy group include, though not necessarily limited to, epoxysilanes such as β-(3,4epoxycyclohexyl)ethyltrimethoxysilane, γ-glycidoxypropyltrimethoxysilane, γ-glycidoxypropyltriethoxysilane, γ-glycidoxypropylmethyldimethoxysilane and γ-glycidoxypropylmethyldiethoxysilane. Examples of the silane compound having an amino group include, though not necessarily limited to, aminosilanes such as γ-aminopropyltrimethoxysilane, γ-aminopropyltriethoxysilane, N-β-(aminoethyl)-γ-aminopropyltrimethoxysilane and N-β-(aminoethyl)-γ-aminopropyltriethoxysilane. Epoxy types are generally desirable in the point that the coating film is hard to white with time and the transparency is easily retained. Particularly, the use of a compound having γ-glycidoxy group is desirable in view of, for instance, reactivity in a crosslinking reaction, durable time of the resin composition and the transparency of the resulting coating film.

The epoxy and amino groups contained in the silane compound are incorporated as a monofunctional group into the cross-linking system of the coating film. The amount of these functional groups present in the coating film greatly affects the qualities of the coating film. It is hence desired to add the silane compound to the resin composition of the present invention in an amount falling in an adequate range.

It is desirable to blend the silane compound having epoxy groups or amino groups, that is, a silane coupling agent such that the ratio of the number of epoxy groups contained in the silane coupling agent to the sum of the number of epoxy groups contained in the epoxy resin (that is, the block copolymer of the present invention having an epoxy group and the silane compound having an epoxy group) and the number of (metha)acryloyl groups contained in the polyfunctional (metha)acrylate compound is in a range between 0.01 and 0.3. Also it is desirable to blend the silane coupling agent such that the ratio of the number of active hydrogens of amino groups contained in the silane compound to the number of active hydrogens of amino groups contained in the amine compound (that is, the polyfunctional amine compound and the silane compound having an amino group) is in a range between 0.01 and 0.3.

The ratio less than 0.01 produces a low effect of improving the performance concerning adhesion to an inorganic base material. When the ratio exceeds 0.3, the condensation between alkoxysilyl groups which is promoted by water contained in the air or the base material precedes the aforementioned Michael addition reaction, curing reaction of the epoxy resin and reaction of the alkoxysilyl group contained in the silane compound with the base material. To state in more detail, a reaction between silane coupling agents in the coating film precedes, making siloxane bonds dense in the coating film. Since the reaction between alkoxysilyl groups in this case is a condensation reaction, the coating film tends to shrink. Therefore, when cross-links produced by the condensation reaction are present in a certain ratio or more, the brittleness of the coating develops such that cracks tend to be produced, leading to a decrease in the impact resistance of the coating. As a consequence, the adhesion of the coating film to a substrate is reduced contrary to a desire to improve it.

It is desirable that the components of the curable resin composition of the present invention be mixed such that the ratio of the number of active hydrogens of amino groups contained in the curing agent to the sum of the numbers of epoxy groups and (metha)acryloyl groups contained in the major agent is in a range between 0.8 and 1.25 and is preferably 1.0 (equivalent). If the number of the active hydrogens of amino groups is small, the crosslinking density is reduced and hence the hardness of the coating film and the de-staining ability are reduced whereas too many hydrogens of amino groups impair the weatherability, water resistance and acid resistance.

To the curable resin composition of the present invention, various additive components may be added for various purposes. For instance, ultraviolet absorbers, light stabilizers such as HALS (Hindered Amine Light Stabilizer) and antioxidants may be added to improve the weatherability. Fillers (e.g., silica), diluents, antifoaming agents and resin components may be added to improve the workability and the qualities of the cured product, to control the viscosity and to reduce the production cost. Antibacterial agents, mildew-proofing agents, antiseptics and the like may be added to impart the added value and pigments may be added for coloring. In the case of blending a polyfunctional (metha)acrylate compound, polymerization inhibitors may be added to restrain the radical polymerization of (metha)acryloyl groups of the acrylate. When these additives are added, additives which react with essential components of the major agent but do not react with essential components of the curing agent are added to the curing agent and additives which react with essential components of the curing agent but do not react with essential components of the major agent are added to the major agent. The major agent and the curing agent are mixed just before coating. By the above measure, improvements in each storage stability, reactivity after the both are mixed and qualities of the cured product can be made. If other than the additives given above, further, plastic beads such as urethane beads, acrylic beads, fluororesin beads, silicon resin beads are blended in the composition, the surface of the coating film can be provided with micro-irregularities. Even in the case where stickers and the like are put up unintentionally on the surface of the coating, they can be easily peeled from the surface due to reduced bonded area (de-labeling effect).

The curable resin composition of the present invention may be blended in other paints, waxes, adhesives or resin compositions to provide each surface and backface of these materials with properties derived from silicone such as de-staining ability, water and oil repellency, low frictional characteristics and releasability.

Preferably each viscosity of the major agent and curing agent is 1,000 mPa.s (25° C.) or less. The viscosity higher than 1,000 mPa.s affects the mixing of the major agent and curing agent and impairs the workability of the composition in the application to the base material. The viscosity can be controlled to some extent by selecting the type of each component to be blended in the major agent and curing agent. It is desirable to adjust the viscosity adequately by blending an organic solvent in a coating step to make a painting operation most easy according to each application of a coating and coating condition. Given as examples of the organic solvent are alcohols such as methanol, ethanol, isopropanol, butanol and isobutanol; ketones such as acetone, methyl ethyl ketone and methyl isobutyl ketone; esters such as ethyl acetate, propyl acetate, isobutyl acetate and butyl acetate; aromatic hydrocarbons such as toluene and xylene; and aliphatic hydrocarbons such as hexane and heptane. These solvents may be used independently or in a mixture system.

The curable resin composition of the present invention is applied to artificial stones such as bricks, tiles, ceramics, concrete, cements, mortars and slates, construction materials such as metals, glass, plastic or other support materials in use.

The present invention is especially effective when the composition is applied to some transparent materials. Such materials may take any form, for example, the form of plate, or film, or may be a variety of construction materials, depending on the purposes for using these transparent materials. When the curable resin composition of the present invention is applied to such transparent base materials, it can make the best use of the property as they are, the transparency of the base, while still imparting enough anti-graffiti property or de-scribbling property to the surface of the base materials as intended.

Given as examples of the transparent base materials to be coated with the above curable resin composition are glass, acrylic resins, polyester, polyvinyl chloride, polycarbonate, polyethylene terephthalate and polyethylene naphthalate. It is preferable to apply the curable resin composition in a thickness of 30 to 0.1 $\mu$m on both surfaces or one surface.

It is desirable to use the curable resin composition whose concentration adjusted to 5–50 wt. % as a solid in an amount of 10 to 500 g as the total amount measured in a wet condition including a solvent per 1 $m^2$ of the surface to be treated. The composition is applied to a plane to be coated by a well-known method such as spraying, dipping, or brushing with a brush or a roller.

Although the objective effect of the composition will be usually developed within a day after it is applied by air drying, it may be subjected to high temperature drying by using an oven or the like as required.

The cold curable resin composition of the present invention may be used as a top coat paint for civil and construction materials and applied to, for instance, the outside and/or inside of structures, specifically, bridge girders of speed ways and multi-level crossings; posts of pedestrian overpasses; electric light poles; poles for flood light; signals and signs; reflecting plates; control boxes; pay stations; fences, floors, external walls, inwalls and partition plates of buildings; construction materials for subways and doorways, advertising plates; refuse bins; construction materials in a place for leaving bicycles; elevated construction materials; public lavatories; ventilating pipes; construction materials in schools and tunnels; and guardrails and enhances the de-staining effect of these construction materials.

Particularly, artificial stones, metal plates, glass, plastic plates and plastic films which are coated with the curable resin composition of the present invention may be used as civil and construction materials for blocks, panels for external and internal walls, windows, wallpapers of interiors and bathrooms to enhance the de-staining effect of these construction materials.

Other specific examples of these construction materials which may be coated with the curable resin composition of the present invention include front, rear and door glasses, fender millers and door millers of vehicles; bodies of transport tools such as cars, rails and planes and glasses of these transport tools; window glasses of high-rise buildings; common window glasses; glass vials for storing enzymes or the like; ampoule vials; vials for storing reagents; other glass bottles for common use and glass products such as mirrors. Also, applicable construction materials are those which require water-repellency, oil-repellency, de-staining ability and weatherability among plastic products, various types of film product, metal products, concrete products, ceramic products, clothes and leather articles, which are used in medicine-related fields, various industrial fields such as food, industrial and agricultural fieldsand households. Specific examples of these construction materials include water-repellent glasses, mist-preventing mirrors, glass vials resisting to adhesion of enzymes, reagents and the like, antibacterial and mildew-proofing plastics, ink jet printer heads, de-snowing and de-icing painted plates, de-snowing and de-icing wires, de-staining aluminum sheet for kitchen, de-staining ventilators, plate materials such as a waterless offset plate, paints for a sacrificed plate used in offset printing and other print plate-related products.

EXAMPLES

The present invention will be hereinafter explained in more detail by way of examples.

Synthesis of Block Copolymer Solution

Synthetic Example 1

Synthesis of Resin Solution A

An 1,000 ml flask equipped with a stirrer, a temperature gauge, a condenser and a nitrogen-introducing pipe was charged with 50 parts of methyl isobutyl ketone and the temperature was raised to 90° C.

A mixture solution was separately prepared, the mixture solution containing 40 parts of glycidylmethacrylate as a monomer having an epoxy group, 10 parts of 2-hydroxyethylmethacrylate as a monomer having a hydroxyl group, 5 parts of γ-methacryloxypropyltrimethoxysilane as a monomer having a hydrolytic silyl group, 30 parts of methylmethacrylate and 10 parts of n-butylmethacrylate as other monomers, 5 parts of VPS-0501 (manufactured by Wako Pure Chemical Industries, Ltd., a polydimethylsiloxane-type polymer azo initiator, molecular weight of a polydimethylsiloxane portion is about 5,000, number average molecular weight is about 20,000–30,000), 0.5 parts of azobisisobutylonitrile as a radical polymerization initiator with a molecular weight of 1,000 or less and 50 parts of methyl isobutyl ketone as a solvent. The mixture solution was added dropwise to the above methyl isobutyl ketone in the flask by using a dropping funnel for two hours.

One hour after completion of the dropwise addition, 0.5 parts of azobisisobutylonitrile was further added. The resulting mixture was then stirred for three hours at the same temperature to complete the polymerization. Thus, a block copolymer having 50% by weight of a solid was obtained. This block copolymer is named "resin solution A.

Synthetic Example 2

Synthesis of Resin Solution B

An 1,000 ml flask equipped with a stirrer, a temperature gauge, a condenser and a nitrogen-introducing pipe was charged with 50 parts of methyl isobutyl ketone and the temperature was raised to 90° C.

A mixture solution separately prepared which contained 40 parts of glycidylmethacrylate, 10 parts of 2-hydroxyethylmethacrylate, 35 parts of methylmethacrylate, 10 parts of n-butylmethacrylate, 5 parts of VPS-0501, 0.5 parts of azobisisobutylonitrile and 50 parts of methyl isobutyl ketone was added dropwise to the above methyl isobutyl ketone in the flask by using a dropping funnel for two hours. In this example, γ-methacryloxypropyltrimethoxysilane which was used as a monomer having a hydrolytic silyl group in Synthetic Example 1 was not used.

One hour after completion of the dropwise addition, 0.5 parts of azobisisobutylonitrile was further added. The resulting mixture was then stirred for three hours at the same temperature to complete the polymerization. Thus, a block copolymer having 50% by weight of a solid was obtained. This block copolymer is named "resin solution B.

Synthetic Example 3

Synthesis of Resin Solution C

An 1,000 ml flask equipped with a stirrer, a temperature gauge, a condenser and a nitrogen-introducing pipe was charged with 50 parts of methyl isobutyl ketone and the temperature was raised to 90°C.

A mixture solution separately prepared which contained 40 parts of glycidylmethacrylate, 5 parts of γ-methacryloxypropyltrimethoxysilane, 40 parts of methylmethacrylate, 10 parts of n-butylmethacrylate, 5 parts of VPS-0501, 0.5 parts of azobisisobutylonitrile and 50 parts of methyl isobutyl ketone was added dropwise to the above methyl isobutyl ketone in the flask by using a dropping funnel for two hours. In this Synthetic Example 3, 2-hydroxyethylmethacrylate which was used as a monomer having a hydroxyl group in Synthetic Example 1 was not used.

One hour after completion of the dropwise addition, 0.5 parts of azobisisobutylonitrile was further added. The resulting mixture was then stirred for three hours at the same temperature to complete the polymerization. Thus, a block copolymer having 50% by weight of a solid was obtained. This block copolymer is named "resin solution C.

Synthetic Example 4

Synthesis of resin solution D

An 1,000 ml flask equipped with a stirrer, a temperature gauge, a condenser and a nitrogen-introducing pipe was charged with 50 parts of methyl isobutyl ketone and the temperature was raised to 90°C.

A mixture solution separately prepared which contained 20 parts of 2-hydroxyethylmethacrylate, 30 parts of γ-methacryloxypropyltrimethoxysilane, 35 parts of methylmethacrylate, 10 parts of n-butylmethacrylate, 5 parts of VPS-0501, 0.5 parts of azobisisobutylonitrile and 50 parts of methyl isobutyl ketone was added dropwise to the above methyl isobutyl ketone in the flask by using a dropping funnel for two hours. In this Synthetic Example 4, glycidylmethacrylate which was used as a monomer having an epoxy group in Synthetic Example 1 was not used.

One hour after completion of the dropwise addition, 0.5 parts of azobisisobutylonitrile was further added. The resulting mixture was then stirred for three hours at the same temperature to complete the polymerization. Thus, a block copolymer having 50% by weight of a solid was obtained. This block copolymer is named "resin solution D.

Synthetic Example 5

Synthesis of resin solution E

An 1,000 ml flask equipped with a stirrer, a temperature gauge, a condenser and a nitrogen-introducing pipe was charged with 50 parts of methyl isobutyl ketone and the temperature was raised to 90° C.

A mixture solution separately prepared which contained 40 parts of glycidylmethacrylate, 10 parts of 2-hydroxyethylmethacrylate, 5 parts of γ-methacryloxypropyltrimethoxysilane, 30 parts of methylmethacrylate, 10 parts of n-butylmethacrylate, 5 parts of VPS-0501, and 50 parts of methyl isobutyl ketone was added dropwise to the above methyl isobutyl ketone in the flask by using a dropping funnel for two hours. In this Synthetic Example 5, azobisisobutylonitrile which was used as a radical polymerization initiator having a molecular weight of 1,000 or less in Synthetic Example 1 was not used.

After completion of the dropwise addition, the resulting mixture was stirred for four hours at the same temperature to complete the polymerization. Thus, a block copolymer having 50% by weight of a solid was obtained. This block copolymer is named "resin solution E.

Polyfunctional amine compound

D-400: polyoxypropylenediamine (JEFFAMINE D-400, manufactured by TEXACOCHEMICAL COMPANY, average molecular weight: 400).

D-230: polyoxypropylenediamine (JEFFAMINE D-230, manufactured by TEXACOCHEMICAL COMPANY, average molecular weight: 230).

Polyfunctional (metha)acrylate compound

DTMPTA: Ditrimethylolpropane tetraacrylate

Silane compound having an epoxy group or an amino group

GPTMS: γ-glycidoxypropyltrimethoxysilane.

APTES: γ-aminopropyltriethoxysilane

Condensation catalyst for hydrolytic silyl group

DBTDL: dibutyltin dilaurate.

In Table 1, each amount used in examples is shown in parts by weight. According to the formulation shown in Table 1, the major agent and the curing agent were mixed such that the ratio of the number of active hydrogens of amino groups contained in the curing agent to the sum of the numbers of epoxy groups and acrylate groups contained in the major agent was 1.0 (equivalent). The mixture was diluted using butyl acetate, methyl isobutyl ketone, ethyl acetate or methyl ethyl ketone so as to contain an effective component in a content of 30 wt. % thereby obtaining a curable resin composition. Although a process of diluting both of the major agent and the curing agent was tried before the both were mixed, there was no difference in the configuration and qualities of the resulting coating film. The major agent and the curing agent could be stored without any viscosity increase and gelation at 25° C. for a long period of time by placing the both in separate containers and by sealing the containers.

TABLE 1

| | Major agent | | | | | | | Curing agent | | | Catalyst |
|---|---|---|---|---|---|---|---|---|---|---|---|
| | Resin solution | | | | | | | | | | |
| | A | B | C | D | E | DTMPTA | GPTMS | D-230 | D-400 | APTES | DBTDL |
| Example 1 | 100 | | | | | | | 16.2 | | | |
| Example 2 | 100 | | | | | 8.21 | | 20.2 | | | |
| Example 3 | 100 | | | | | 8.63 | 3.51 | 21.3 | | | |
| Example 4 | 100 | | | | | 8.20 | | | 33.8 | 1.56 | |
| Example 5 | | | | | 100 | 8.63 | 3.51 | 21.3 | | | |
| Comparative example 1 | | 100 | | | | 8.63 | 3.51 | 21.3 | | | |
| Comparative example 2 | | | 100 | | | 8.63 | 3.51 | 21.3 | | | |
| Comparative example 3 | | | | 100 | | | | | | | |
| Comparative example 4 | | | | 100 | | | | | | | 1.00 |

Each cold curable resin composition obtained in the examples and comparative examples was applied to a cement sheet of 15 cm×7 cm×2 mm in an amount of 150 g/m² by using a brush and was dried at 23° C. under a humidity of 65% for 24 hours. Further, each cold curable resin composition was applied to an acrylic plate or glass plate of 20 cm×10 cm×2 mm in a thickness of 10 μm by using an applicator and was dried at 23° C. under a humidity of 65% for 24 hours.

Using the above cured coating films, the de-staining ability and removability when scribbling was made and the transparency of the coating film were evaluated. Also, the durable time or pot life, which is the duration how long the resin composition is usable for the coating after the mixture of the composition is made, was evaluated. Each test method and evaluation standard adopted are shown in the following. The results of evaluation are shown in Table 2.

Durable time

The major agent and the curing agent were mixed with each other, sealed and stored at 40° C. to evaluate whether the mixture solution could be used or not. The standard for judging whether the mixture solution can be used or not is based on whether or not it is in the condition that it can be applied in the same way as in the initial stage just after mixed, and at the same time, based on whether or not a coating film which is allowed to stand for 24 hours after the coating procedure is carried out using the mixture solution stored for a prescribed period of time after the mixing differs in the appearance and qualities from a coating film formed using the mixture solution obtained just after mixed.

◯: The use of the mixture solution is possible even after it is stored over 12 hours after being mixed.

X: The use of the mixture solution is made impossible within 12 hours after being mixed.

Workability

Workability in the application by brushing was evaluated.

◯: No problem.

X: High viscosity and poor workability.

De-staining ability and Removability after coating

The cold curable resin composition with 30% effective component was applied and cured at room temperature for 24 hours. An attempt was made to draw a 5 to 10 mm-wide and 30 to 50 mm-long line on the surface of the coating by using an oily magic marker. The area occupied by the marker ink left unrepelled on the coating film was measured to evaluate the non-adhesive property of the coating film.

5: The ink was repelled and left spot-wise on the coating film.

4: The ink was repelled and left line-wise on the coating film.

3: The area was reduced to 50% or less.

2: The area was reduced to 75–50%.

1: 75% or more of the area remained occupied by the ink.

Further, the surface of the coating was rubbed using a dry cloth when 24 hours passed after the marker line was drawn as above-described to evaluate the removability.

5: The ink could be easily and thoroughly wiped out by dry wiping.

4: The ink could be completely removed by rubbing strongly by dry wiping.

3: The ink could not be completely removed by dry wiping, but could be completely removed if a cloth impregnated with ethanol was used.

2: The ink could not be completely removed even if a cloth impregnated with ethanol was used, but could be completely removed using an aromatic solvent such as xylene.

1: The ink could not be completely removed using any of the above methods or the coating film itself was peeled off by the wiping procedure.

Transparency of coating film

In the case of applying the curable resin composition to an acrylic plate or glass plate base material, transmission property for visible light of the coated base material was evaluated by visual observation.

◯: Transparent.

X: Misty.

Both the acrylic plate and glass plate had a thickness of 2 mm. When taking the transmittance of light with a wavelength of 660 nm through the air as a standard, the two base materials have the following, relative transmittance values for a light ray having a wavelength of 660 nm:

Acrylic plate: 93.2%

Grass plate: 90.4%

The "transmission factor" (%) shown in table 2 is the ratio of the intensity of light passing through a coated plate to the intensity passing through the non-coated plate of the same material (acrylic or grass, thickness was 2 mm). That is, in absorptiometer, a coated surface of a base material was irradiated vertically with light with a wavelength of 660 nm to detect any decrease in transmission from the transmission by the non-coated one.

From Table 2, one can see approximately the same transparencies as those of non-coated were obtained in the coated plates. Therefore, we can conclude that the coating films prepared according to the present invention were so clear as to maintain the transparencies of the base materials themselves. It is considered that microscopic phase-separation between polyorganosiloxane portions and the other copolymer portions in the block copolymer occurred as intended in the present invention, which is believed to result in such high transparencies of the coating films.

TABLE 2

|  | Base material | Durable time | Workability during coating | De-staining ability | | Transparency | |
|---|---|---|---|---|---|---|---|
|  |  |  |  | Non-adhesive property | Removability | Visual observation | Transmission factor |
| Example 1 | Acrylic plate | ◯ | ◯ | 4 | 4 | ◯ | 102 |
| Example 2 | Acrylic plate | ◯ | ◯ | 5 | 5 | ◯ | 103 |
| Example 3 | Glass plate | ◯ | ◯ | 5 | 5 | ◯ | 102 |
|  | Cement sheet | ◯ | ◯ | 5 | 5 | — | — |
| Example 4 | Acrylic plate | ◯ | ◯ | 4 | 4 | ◯ | 100 |
|  | Cement sheet | ◯ | ◯ | 4 | 5 | — | — |
| Example 5 | Glass plate | ◯ | X | 5 | 5 | ◯ | 100 |
|  | Cement sheet | ◯ | X | 5 | 5 | — | — |
| Comparative example 1 | Glass plate | ◯ | ◯ | 3 | 2 | ◯ | 102 |
|  | Cement sheet | ◯ | ◯ | 3 | 2 | — | — |
| Comparative example 2 | Acrylic plate | ◯ | ◯ | 2 | 4 | ◯ | 101 |
|  | Cement sheet | ◯ | ◯ | 2 | 5 | — | — |
| Comparative example 3 | Glass plate | ◯ | ◯ | 1 | 1 | ◯ | 102 |
|  | Cement sheet | ◯ | ◯ | 1 | 1 | — | — |

TABLE 2-continued

| | Base material | Durable time | Workability during coating | De-staining ability | | Transparency | |
| | | | | Non-adhesive property | Removability | Visual observation | Transmission factor |
|---|---|---|---|---|---|---|---|
| Comparative example 4 | Glass plate | X | ○ | 4 | 4 | ○ | 101 |
| | Cement sheet | X | ○ | 4 | 5 | — | — |

What is claimed is:

1. A cold curable resin composition comprising a block copolymer of a polyorganosiloxane portion and a polymer portion having an epoxy group, a hydroxyl group and a hydrolytic silyl group.

2. The composition according to claim 1, further comprising a polyfunctional amine compound.

3. The composition according to claim 2, wherein the ratio of the number of active hydrogen of amino groups contained in said polyfunctional amine compound to the number of said epoxy groups is in a range between 0.8 and 1.25.

4. The composition according to claim 2, wherein said polyfunctional amine compound is polyoxyalkylenepolyamine having a molecular weight of 1,000 or less.

5. The composition according to claim 1, wherein said block copolymer is a polymer in which a polydimethylsiloxane portion and a copolymer portion comprising an α,β-ethylenic unsaturated monomer having an epoxy group, an α, β-ethylenic unsaturated monomer having a hydroxyl group, an α, β-ethylenic unsaturated monomer having a hydrolytic silyl group and other α, β-ethylenic unsaturated monomer are bound with each other in the form of a block polymer.

6. The composition according to claim 5, wherein said composition contains 10–50 parts by weight of said α, β-ethylenic unsaturated monomer having an epoxy group, 1–10 parts by weight of said α, β-ethylenic unsaturated monomer having a hydrolytic silyl group, 1–20 parts by weight of said α, β-ethylenic unsaturated monomer having a hydroxyl group and 0.05–20 parts by weight of said polyorganosiloxane portion.

7. The composition according to claim 1, wherein said block copolymer is produced by copolymerizing an α, β-ethylenic unsaturated monomer having an epoxy group, an α, β-ethylenic unsaturated monomer having a hydroxyl group, an α, β-ethylenic unsaturated monomer having a hydrolytic silyl group and other one or more α, β-ethylenic unsaturated monomers in the presence of a polymer azo-type initiator represented by the following general formula and a radical polymerization initiator having a molecular weight of 1,000 or less:

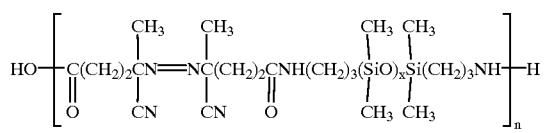

wherein x represents an integer from 10 to 300 and n represents an integer from 1 to 20.

8. The composition according to claim 7, wherein said radical polymerization initiator having a molecular weight of 1,000 or less is a compound selected from the group consisting of peroxides and azobis compounds.

9. The composition according to claim 1 or 2, further comprising a polyfunctional (metha)acrylate compound.

10. The composition according to claim 9, wherein the polyfunctional (metha)acrylate compound has a molecular weight of 1,000 or less.

11. The composition according to claim 9, wherein said polyfunctional (metha)acrylate compound is ditrimethylolpropane tetra(metha)acrylate.

12. The composition according to claim 9, wherein the ratio of the number of active hydrogen of amino groups contained in said polyfunctional amine compound to the sum of the number of said epoxy groups and the number of acrylate groups of said polyfunctional (metha)acrylate compound is in a range between 0.8 and 1.25.

13. The composition according to claim 1, further comprising a silane compound having an epoxy group or an amino group.

14. A coated base material whose surface is coated with the cold curable resin composition according to claim 1 or 2.

15. The coated base material according to claim 14, wherein said base material to be coated is a material selected from the group consisting of artificial stones, glass, plastic plates and plastic films.

16. A coated transparent base material with one surface or both surfaces coated with the cold curable resin composition according to claim 1 or 2, wherein said coated transparent base material transmits 99% of light with a wavelength of 660 nm.

17. The coated base material according to claim 14, being used for de-staining exterior or interior of civil or construction materials.

18. The coated base material according to claim 16, being used for de-staining exterior or interior of civil or construction materials.

19. A method for producing a cold curable resin composition, said method comprising copolymerizing an α, β-ethylenic unsaturated monomer having an epoxy group, an α, β-ethylenic unsaturated monomer having a hydroxyl group, an α, β-ethylenic unsaturated monomer having a hydrolytic silyl group and other one or more α, β-ethylenic unsaturated monomers in the presence of a polymer azo-type initiator represented by the following general formula and a radical polymerization initiator having a molecular weight of 1,000 or less:

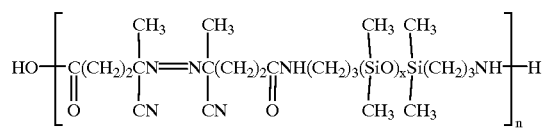

wherein x represents an integer from 10 to 300 and n represents an integer from 1 to 20.

* * * * *